Oct. 8, 1968 G. A. PHILBRICK 3,405,366
ELECTRONIC AMPLIFIER
Filed June 30, 1965
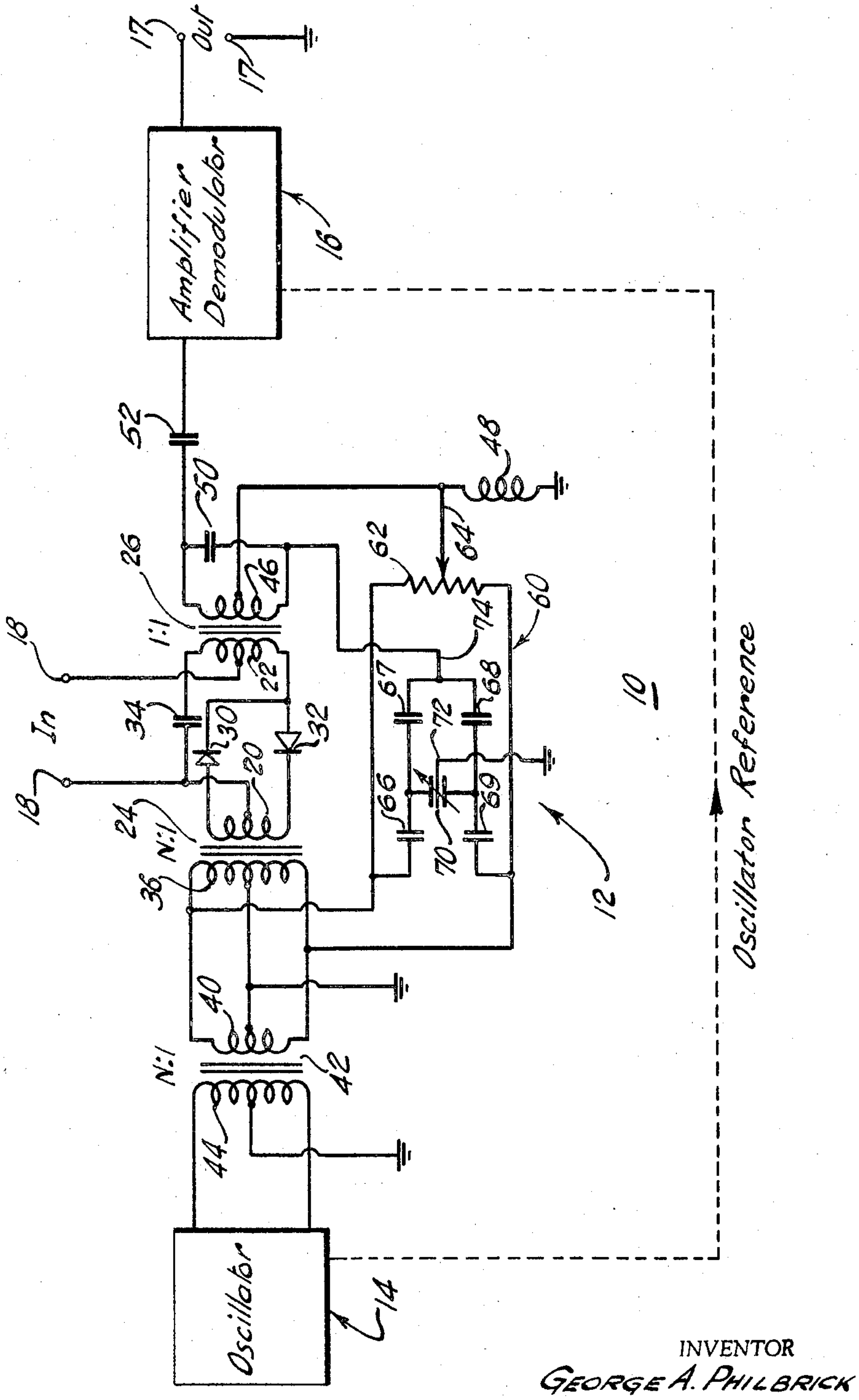
INVENTOR
GEORGE A. PHILBRICK
BY
Curtis, Morris & Safford
ATTORNEYS.

United States Patent Office 3,405,366
Patented Oct. 8, 1968

3,405,366

ELECTRONIC AMPLIFIER

George A. Philbrick, Dover, Mass., assignor to George A. Philbrick Researches, Inc., Dedham, Mass., a corporation of Massachusetts Filed June 30, 1965, Ser. No. 468,279
8 Claims. (Cl. 330—7)

ABSTRACT OF THE DISCLOSURE

An improved high gain highly stable parametric type of amplifier in which a single pair of variable capacity diodes, a single capacitor, and a pair of transformers are arranged in a balanced bridge to which is applied a carrier wave. The balance of the bridge is changed in accordance with a low level input signal, the output from the bridge being accurately proportional to a low level input signal. Because only two diodes and a single capacitor are required, the problems of matching of components and temperature stability are considerably simplified. The use of isolating transformers gives a high degree of isolation between the input and the remainder of the amplifier circuit.

The present invention relates to an improved electronic amplifier, in particular, to one commonly known as an operational amplifier.

An object of this invention is to provide an operational amplifier which has improved stability and accuracy.

A further object is to provide such an amplifier which is simpler and less expensive to manufacture than previous similar amplifiers.

A more specific object is to provide a highly stable, high gain D.C. amplifier having extremely high input impedance.

These and other objects will in part be understood from and in part pointed out in the following description.

The usefulness of an operational amplifier is well-known to those skilled in the art; typical applications include analog computation, instrumentation, and so forth. An operational amplifier is a high gain device able to operate with extremely low input signal voltages and currents to give a relatively high level voltage output accurately related to the input over a frequency range from D.C. to many kilocycles per second.

One of the most difficult problems in building a high gain amplifier with D.C. response and with high input impedance is to minimize "drift," that is, unwanted change in output voltage when the input voltage remains fixed. Drift is caused by the change in the operating characteristics of the elements of the amplifier circuit. These changes can be due to long term ageing or to variations in gain, resistance, capacitance, etc. of circuit components as a function of temperature.

To minimize drift, workers in the art have developed amplifiers which operate by modulating an alternating carrier voltage in accordance with a very low level D.C. voltage. The modulated carrier is then A.C. amplified and demodulated, that is, rectified, to give a high level D.C. output accurately proportional to the input.

One of the most effective of the modulating-type of amplifiers is that using a ring of four variable-capacity silicon diodes connected in a four terminal bridge arrangement. An A.C. modulating voltage is applied to one diagonal pair of terminals of the bridge and an A.C. output signal is obtained at the other pair of terminals. When the diodes are exactly matched in capacity, and assuming that the modulating signal is not great enough to cause any of the diodes to conduct in the forward direction, the output voltage will be exactly zero. By applying a very low level bias, in the form of an input signal, to the diodes, their capacities can be changed and the bridge unbalanced. This results in an A.C. voltage being produced across the output terminals of the bridge, the A.C. voltage being substantially exactly proportional to the input signal voltage over a wide range of operation.

Now, in order to achieve great accuracy in this type of amplifier, it is necessary to match as closely as possible to each other the four diodes with respect to their electrical characteristics, namely absolute capacity at a given temperature, change in capacity versus temperature, back resistance, and forward current versus voltage. Even assuming that the diodes of the bridge are of the same type and produced in the same lot, it is difficult if not impossible to select four that are precisely the same in all of these characteristics. Moreover, precise matching requires expensive testing. The present invention, by eliminating two of the four diodes previously required, considerably simplifies manufacturing procedures and at the same time reduces the cost of components. But also, because matching of one diode to only one other diode is now all that is needed, rather than the matching of one diode to three others, much greater accuracy and improved performance in circuit operation are obtained.

In accordance with the invention, in one specific embodiment thereof, a single pair of variable-capacity silicon diodes is arranged in a unique, bridge-like arrangement. A carrier voltage is applied to the diodes from the low impedance side of a step-down transformer network, which in turn is connected to the output of a high frequency oscillator. A modulated output voltage is obtained from the bridge through another transformer, the output from which is A.C. amplified and demodulated to obtain a high level D.C. voltage output proportional to a signal voltage. This signal voltage is applied to the bridge at respective center taps on the appropriate windings of the input and output transformers.

The unique bridge and transformer arrangement of this circuit makes possible extremely high impedance isolation of the input signal terminals from the remainder of the circuit, moreover unwanted feedthrough or stray pickup from the oscillator is minimized. The circuit has improved common mode noise cancellation, higher signal to noise ratio, and much better stability than previously known circuits. For example, in comparison with one of the best, four diode circuits of the prior art, the circuit of the present invention has, in its practical embodiment, at least ten times greater signal sensitivity (for a given degree of accuracy), and at least five times better temperature stability, in spite of the fact that the present circuit is less expensive to manufacture.

A better understanding of the invention, together with a fuller appreciation of its many advantages will best be gained from the following description given in connection with the single figure of the drawing which shows an electrical circuit embodying the invention.

The amplifier circuit 10 shown in the drawing comprises a bridge and transformer arrangement, generally indicated at 12, a carrier voltage oscillator 14, and an A.C. amplifier, demodulator, and D.C. output module generally indicated at 16. The latter produces a direct output voltage at a pair of terminals 17. Oscillator 14 and the amplifier-demodulator 16 can be like ones known in the art and will not be described in greater detail.

Bridge-transformer arrangement 12 has a pair of input signal terminals 18, one of which connects to a transformer winding 20, and the other to a transformer winding 22. Winding 20 is the low impedance secondary of a transformer 24, and winding 22 is the primary of a transformer 26. These transformers, which will be described shortly, provide very high impedance isolation of the signal terminals from circuit ground.

Connected to the upper end of winding 20 is a first diode 30 and connected to the lower end, is is a second diode 32. These two diodes are of the variable-capacity silicon type, carefully matched as explained above. They are poled as shown, with the cathode of diode 30 being connected to the anode of diode 32. This common point is connected to the lower end of winding 22, the upper end of which is connected by a capacitor 34 to the center tap of winding 20. The capacity of capacitor 34 is twice the nominal capacity of diode 30 or diode 32. These elements form a bridge-like network which, by shifting the absolute value of capacity of diodes 30 and 32 by means of an input signal, becomes unbalanced in proportion to the input signal. The use of a single capacitor here eliminates the difficulty of using additional diodes or an additional capacitor. Capacitor 34 is selected from a type having great temperature stability.

Transformer 24 has a primary winding 36, the center tap of which is grounded; the turns ratio of primary to secondary is, for example, eight to one. This transformer has a small torroidal ferrite core with winding 20 comprising one turn of a bifilar winding on one side of the core, and winding 36 comprising N turns on the opposite side of the core. Thus the windings have low capacity between them, and winding 20 presents a very low, balanced impedance across itself.

Primary winding 36 is connected to a secondary winding 40 of a transformer 42 which has a primary winding 44. The latter is connected to the balanced output of oscillator 14. Transformer 42 is substantially identical to transformer 24 and is physically isolated from it by the lead connections between secondary 40 and primary 36. Thus stray pickup from the oscillator is minimized.

Transformer 26 has a secondary winding 46, the center tap of which is connected via a small inductor 48 to ground. Winding 46 is shunted by a small trimmer capacitor 50; the upper end of the winding is connected via a coupling capacitor 52 to amplifier-demodulator 16. Transformer 26 is similar to transformer 24 except that a one-to-one turns ratio is used.

In order to cancel out residual and unbalanced stray errors in the output signal on secondary winding 46 of transformer 26, there is connected between this winding and the primary 36 of transformer 24 an adjustable balancing network generally indicated at 60. This includes a potentiometer 62 connected in parallel across primary 36 and having an adjustable center tap 64 connected to the center tap of secondary 46. Network 60 also includes four small capacitors 66, 67, 68 and 69, of equal size and which are connected in series with each other and across primary 36. Connnected in shunt across capacitors 67 and 68 is an adjustable trimmer capacitor 70 having a grounded center tap 72. The junction of capacitors 67 and 68 is connected via a lead 74 to the lower side of secondary winding 46.

In a circuit substantially identical to the one described herein which has been built and successfully operated, oscillator 14 operated at 5 mc. and gave an output of roughly 7 volts. Demodulator 16 was a synchronous rectifier preceded by an A.C. amplifier and followed by a high level D.C. amplifier. An input signal of 0.2 millivolt produced an output voltage of about 10 volts. The input impedance of the circuit is thousands of megohms.

The above description is intended in illustration and not in limitation. Various minor changes in the embodiment set forth may occur to those skilled in the art and can be made without departing from the spirit or scope of the invention.

I claim:

1. An improved amplifier including a single pair of matched semi-conductor diodes and a single capacitor, a first transformer having a low impedance secondary, said diodes being connected in series across said secondary, a second transformer having a primary, one side of said primary being connected to both of said diodes, the other side of said primary being connected to one side of said capacitor, said primary and secondary windings having respective center taps, the other side of said capacitor being connected to the center tap of said secondary winding, input signal means connected to said center taps, oscillator means connected to the primary of said first transformer, output signal means connected to the secondary of said second transformer and including a demodulator for obtaining a D.C. output proportional to signal input, and balancing means for minimizing strays and errors, said means including an adjustable resistor capacitor network connected between the secondary of said second transformer and the primary of said first transformer.

2. The arrangement in claim 1 wherein said transformers have very low capacity coupling between their windings and are physically spaced to minimize unwanted pickup from said oscillator means.

3. The arrangement in claim 2 wherein said oscillator means includes a third transformer having a secondary which is connected across the primary of said first transformer, said first and third transformers having substantial step-down ratios from primary to secondary.

4. In an amplifier of the character described, a balanced bridge-like network comprising a single pair of matched variable-capacity diodes and a single capacitor having a value twice the nominal capacity of one of said diodes, the anode of one diode being connected at a junction point to the cathode of the other diode, first low impedance means connecting the other anode and cathode of said diodes, and second impedance means, said capacitor and said second impedance means being connected in series between said first impedance means and said junction point.

5. A improved high gain highly stable amplifier comprising: a bridge-like network which includes a single pair of matched variable capacity semi-conductors connected in series with an electrode of one being connected to an opposite electrode of the other at a junction point, a first transformer having a primary and having a secondary with a center tap, a second transformer having a primary and a secondary, a capacitor, said semi-conductors being connected in series across the secondary of said first transformer, said capacitor and the primary of said second transformer being connected in series between the center tap of the secondary of said first transformer and said junction point, input signal means to apply a low level signal to at least one of said semi-conductors to change its capacity, means to apply a carrier wave to the primary of said first transformer, and output means connected to the secondary of said second transformer to obtain an output signal accurately proportional to the low level input signal, said network for zero input signal being substantially balanced at the frequency of said carrier wave and allowing substantially no carrier wave at the primary of said second transformer, and for increasing input signals allowing proportionally more and more carrier at the primary of said second transformer.

6. The arrangement in claim 5 wherein the secondary of said first transformer presents a balanced low impedance across itself, the capacitance value of said capacitor being substantially twice the nominal capacitance of either of said semi-conductors.

7. The arrangement in claim 5 wherein said transformers are small torroidal magnetic cores with their primaries and secondaries wound respectively on opposite sides of the cores, said network being greatly isolated by low capacity coupling through said transformers with respect to the remainder of said amplifier.

8. In an amplifier of the character described wherein an input carrier wave is modulated by a low level input signal to give an output carrier wave having a modulated component accurately proportional to the input signal but of much higher level, a bridge-like network comprising a low impedance input winding across which an input carrier wave is applied, a single pair of matched variable capacity semi-conductors connected together at a junction point and connected in series across said input winding, an output winding across which is obtained an output carrier wave, a single capacitor having a value substantially twice the nominal capacity of one of said semi-conductors, said capacitor and said output winding being connected in series between said junction point and a point on said input winding, and means to apply a low level input signal to at least one of said semi-conductors to change its capacity.

References Cited

UNITED STATES PATENTS

| | | | |
|---|---|---|---|
| 2,191,315 | 2/1940 | Guanella | 330—7 |
| 2,922,959 | 1/1960 | Holloway et al. | 332—47 |
| 2,956,234 | 10/1960 | Olsen | 330—7 X |

ROY LAKE, *Primary Examiner.*

NATHAN KAUFMAN, *Assistant Examiner.*